United States Patent [19]

van der Lely et al.

[11] 4,381,080

[45] Apr. 26, 1983

[54] SPREADING DEVICE FOR EFFECTING A UNIFORM DISTRIBUTION OF MATERIAL SUCH AS FERTILIZER

[75] Inventors: Ary van der Lely, Maasland; Cornelis J. G. Bom, Rozenburg, both of Netherlands

[73] Assignee: C. Van der Lely N.V., Maasland, Netherlands

[21] Appl. No.: 14,643

[22] Filed: Feb. 23, 1979

[30] Foreign Application Priority Data

Feb. 24, 1978 [NL] Netherlands ................. 7802074

[51] Int. Cl.³ .................................................. A01C 17/00
[52] U.S. Cl. ................................... 239/666; 239/661; 239/687
[58] Field of Search ............... 239/521, 522, 524, 650, 239/665, 666, 661, 664, 667, 670, 672, 673, 675, 677, 681, 682, 684, 687

[56] References Cited

U.S. PATENT DOCUMENTS

| Re. 14,804 | 2/1920 | Holden | 239/673 |
|---|---|---|---|
| 788,911 | 5/1905 | Jones | 239/666 |
| 1,508,210 | 9/1924 | Bangert | 239/666 |
| 2,281,212 | 4/1942 | Stoltzfus | 239/664 |
| 2,594,084 | 4/1952 | Skibbe et al. | 239/665 |
| 2,886,334 | 5/1959 | Presler | 239/665 |
| 3,559,894 | 2/1971 | Murray et al. | 239/672 |
| 3,682,395 | 8/1972 | van der Lely et al. | 239/666 |
| 3,790,090 | 2/1974 | Lurenc et al. | 239/684 X |
| 3,819,120 | 6/1974 | Walker | 239/684 X |
| 4,032,074 | 6/1977 | Amerine | 239/687 X |
| 4,081,142 | 3/1978 | Harderup | 239/666 X |
| 4,169,559 | 10/1979 | McKee | 239/687 X |

FOREIGN PATENT DOCUMENTS 2828636 1/1979 Fed. Rep. of Germany ...... 239/674

OTHER PUBLICATIONS

"The Multi-Spread Process"; The Multi-Spread Co., 2104 North Grande Ave., Spencer, Iowa.

*Primary Examiner*—Robert W. Saifer
*Attorney, Agent, or Firm*—Penrose Lucas Albright

[57] ABSTRACT

An agricultural device for spreading granular or powdery material or both, particularly fertilizer, which has at least one distribution member that rotates about a vertical axis. A hopper has a dosing member which is disposed over the distribution member at its axis for feeding material to be spread around such axis whereby it is thrown from the distribution member by centrifugal force. At least one screen plate for deflecting the material so thrown is spaced outwardly from the circumference of the distribution member and is entirely located on one side of a plane which passes through the axis of the distribution member and is disposed at a right angle to the intended direction of operative travel of the device. The screening plate deflects the material impinging thereon vertically downwardly whereby the desired uniform characteristics are achieved in the distribution pattern of the material being spread. The screen plate may either lead or trail its associated distribution member relative to the operative travel of the device. Two screen plates may be utilized on both sides of the distribution member whereby one leads and the other trails same.

33 Claims, 12 Drawing Figures

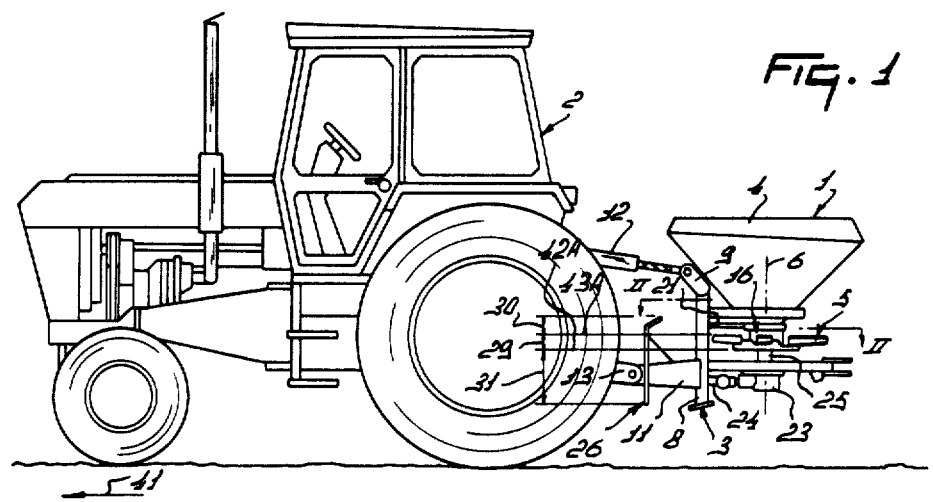
FIG. 1
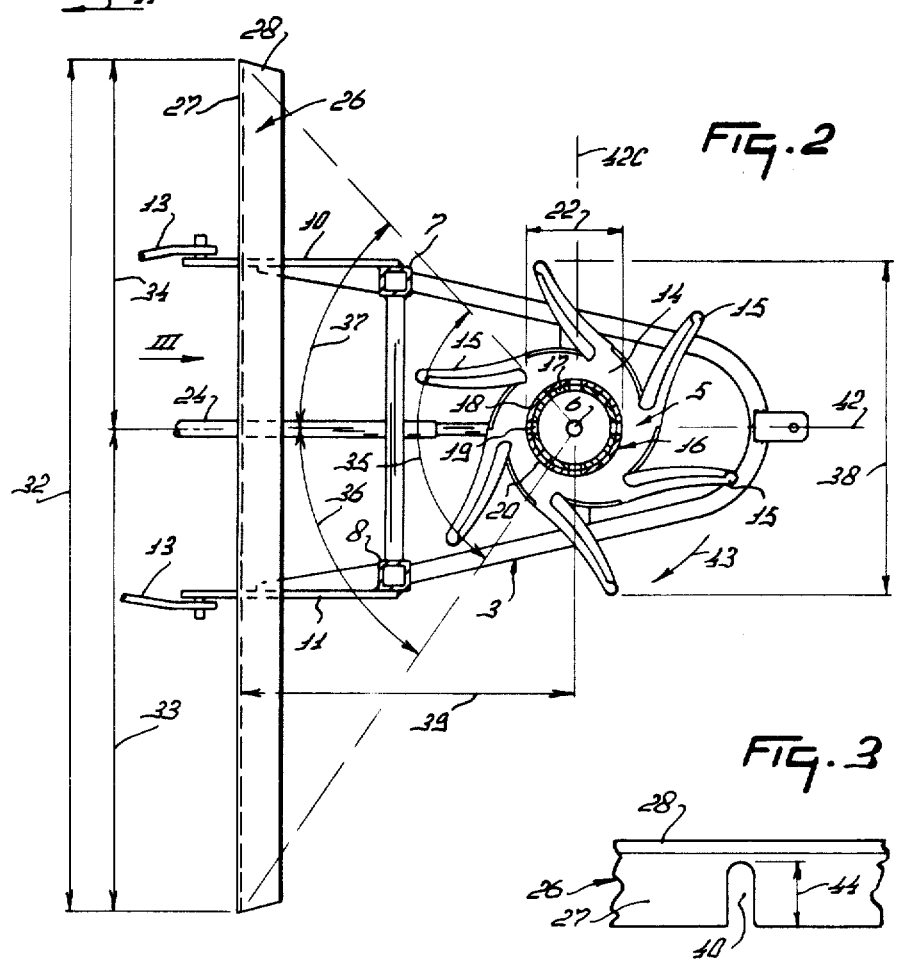
FIG. 2
FIG. 3

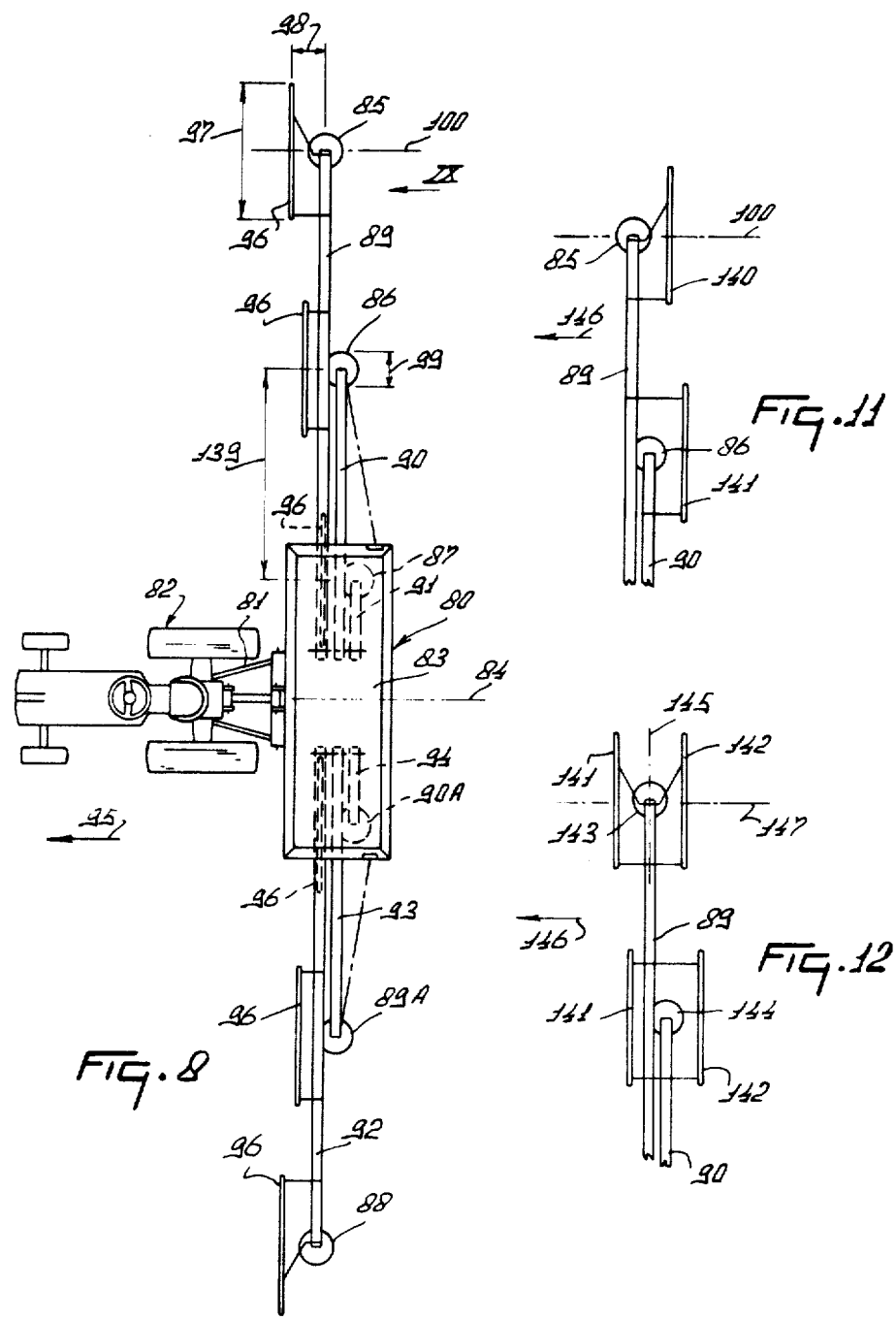

SPREADING DEVICE FOR EFFECTING A UNIFORM DISTRIBUTION OF MATERIAL SUCH AS FERTILIZER

SUMMARY OF THE INVENTION

This invention relates to agricultural devices for spreading granular or powdery materials or both, particularly fertilizers.

According to the present invention there is provided a device for spreading material, comprising at least one distribution member adapted to rotate about an upwardly extending axis and feeding means through which, during the operation of the device, material to be spread is supplied around the rotary axis to the distribution member; there being in the region of the circumference of the distribution member at least one deflector means extending on only one side of a plane passing through the rotary axis of the distribution member and being at right angles to the intended direction of operative travel of the device.

In a device as just defined, the deflector means can be designed and mounted on the device in a simple manner, and feed of material to the distribution member can be carried out in a simple manner without the need for performing various adjustments, for example, to suit the device to spreading different materials. Furthermore, for various kinds of material, and irrespective of the nature of the material, a uniform distribution spectrum can be obtained.

In one embodiment of the device the deflector means is substantially at right angles to the longitudinal center line of the device whereby the shape of the deflector means can be as simple as possible.

An advantageous embodiment of the device is obtained if the distance between the screening plate and the rotary axis of the distribution member, measured in the plane of rotation of the distribution member, is substantially equal to the diameter of the distribution member.

One embodiment of the device comprises means for attaching the device to the lifting device of a tractor or a similar vehicle, the screening plate being located between the tractor and the distribution member, which is located near the longitudinal center line of the tractor.

In a further embodiment of the device, with a view to ensuring in a simple manner that the material will be uniformly supplied to the distribution member around the rotary axis of the distribution member, the distribution member communicates with a feeding member provided with a plurality of ports evenly distributed about the rotary axis of the distribution member.

In a further advantageous embodiment of the device the material is supplied to a feeding pipe through a feeding mechanism extending laterally of this pipe, the mechanism comprising a guide for guiding the material so that it is evenly fed to the distribution member around the rotary axis of the distribution member.

For a better understanding of the invention and to show how the same may be carried into effect, reference will now be made, by way of example, to the accompanying drawings, in which:

BRIEF DESCRIPTION OF THE DRAWINGS

FIG. 1 is a side view of a granular and/or powdery material spreading device, shown attached to a tractor.

FIG. 2 is a plan view, on a larger scale, of part of the device of FIG. 1 taken on the line II—II in FIG. 1, FIG. 3 is a broken view of a detail of a screening plate of the device, taken in the direction of the arrow III in FIG. 2, FIG. 8 is a schematic plan view of another form of granular and/or powdery material spreading device, FIG. 11 is a schematic plan view of part of a modified form of the device shown in FIG. 8, and FIG. 12 is a schematic plan view of part of another modified form of the device of FIG. 8.

DESCRIPTION OF THE PREFERRED EMBODIMENTS

Figure 4:
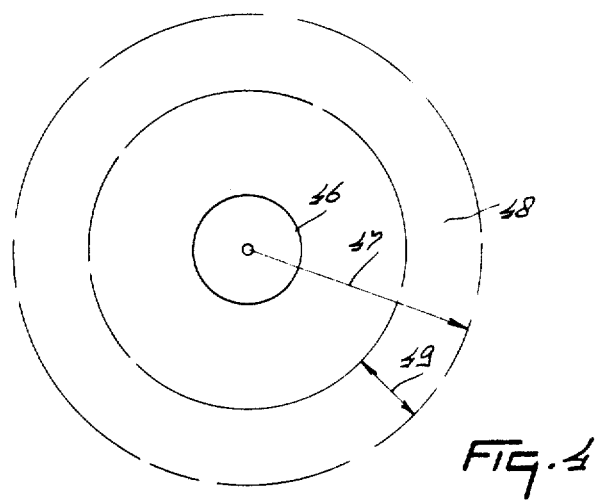
FIG. 4 is a schematic plan view of a distribution spectrum that can be obtained by the spreading device of FIGS. 1 to 3 with the deflector means omitted.

The spreading device 1 of FIGS. 1 to 3, shown in FIG. 1 coupled with a tractor 2, has a frame 3 provided with a hopper 4 and a distribution member 5 adapted to rotate; about a vertical rotary axis 6. The frame 3 includes two vertical beams 7 and 8, interconnected at the top and having a coupling member 9 for attachment to the topmost arm 12 of the lifting device of the tractor 2. The vertical beams 7 and 8 are provided near their lower ends with supports 10 and 11 which can be coupled with the lowermost arms 13 of the lifting device of the tractor.

Between the hopper 4 and the distribution member 5, which is formed by a disc 14 with ejecting arms 15 fastened thereto, there is a dosing member 16. The dosing member 16 is formed by two rings 17 and 18 which are concentric with the axis 6. Each of the rings 17 and 18 has eight outlet ports 19 and 20 respectively which are evenly distributed around the rotary axis 6. The ring 18 is connected with a setting and fixing device 21 so that the ports 20 can be made to coincide to a greater or lesser extent with the ports 19 for regulating the magnitude of the passage, provided by the ports 19, through which material can be passed from the hopper to the disc 14 of the distribution member. The dosing member 16 has a diameter 22 which is equal to about one quarter of the diameter 38 of the distribution member 5. Preferably the diameter 22 is larger than ten centimeters and smaller than thirty centimeters.

The distribution member 5 is coupled with a vertical shaft 25 journalled in a gear box 23. The gear box 23 contains a transmission gear which can be coupled through an intermediate shaft 24 with the power take-off shaft of the tractor 2.

The frame 3 is provided with a deflector means 26, which is fastened to the arms 10 and 11 in the form illustrated. The deflector means 26 extends at only one side (in the illustrated form, in front) of the vertical plane 42C containing the axis 6 and extending at right angles to the intended direction of operative travel (arrow 41 in FIG. 1) of the tractor over the ground. The screening plate 26 has a flat portion 27 having along the top an upwardly extending inclined part or rim 28 located on the distribution member side of the portion 27 (so that the part 28 extends upwardly and rearwardly with respect to the operative travelling direction of the tractor. The plate portion 27 is parallel to the rotary axis 6 of the distribution member 5 and extends, in the illustrated form, at right angles to the usual operative travelling direction of tractor 2. The plate portion 27 includes a height 29 that is between planes 42A and 43A at right angles to the rotary axis 6 and containing the bottom and top boundaries respectively of the distribution member 5. The plate 26 further projects over a distance 31 below the plane 42A and over a distance 30 above the plane 43A. The distance 30 in the illustrated form is preferably not smaller than approximately the height 29. The distance 31 preferably is at least twice the height 29. In the illustrated form the distance 31 is about four times the height 29.

Measured in a direction at right angles to the usual operative travelling direction of tractor 2 (arrow 41), the screening plate 26 covers a distance 32. The distance 32 is preferably equal to about twice the diameter 38 of the distribution member or is larger. The distance 32 is preferably at least about 1.5 times the diameter 38, but smaller than four times the diameter 38. In the illustrated form the distance 32 is about 2.5 times the diameter 38 of the distribution member 5. The portion 27, which is the essential part of the screening plate 26, is located at a distance 39 from the rotary axis 6 of the distribution member 5. This distance preferably exceeds about three-quarters of the diameter 38 of the distribution member, but is preferably not larger than twice the diameter 38. In the illustrated form the distance 39 is approximately equal to the diameter 38 of the distribution member. The distance 39 may be made variable by mounting the plate 26 in an adjustable manner on the frame 3.

The screening plate 26 extends on one side of the vertical plane 42 extending in the tractor operative travelling direction (arrow 41) and containing the center of the distribution member 5 over a larger distance than on the other side of this place. Since the rotary axis 6 is vertical, the plane 42 contains not only the center of the distribution member but also the rotary axis 6 passing through the center of the distribution member. In this embodiment, viewed in the direction of the arrow 41, the screening plate 26 extends on the left-hand side (FIG. 2) of the plane 42 over a distance 33 and on the other side of the vertical plane 42 over a distance 34, preferably the distance 33 is not larger than about 1.5 times the distance 34. The distance 33 in the illustrated form is about 1.2 times the distance 34.

In the illustrated form the drive of the distribution member 5 is such that during the operation of the device the distribution member 5 rotates about the axis 6 in the direction of arrow 43. With this direction of rotation the part of the distribution member 5 nearest the screening plate 26 moves through the vertical plane 42 from left to right in FIG. 2. From the side where parts of the distribution member pass through the plane 42 during rotation the screening plate 26 extends over a larger distance from the plane 42 than on the other side, that is, as already described, the distance 33 on the left-hand side of the vertical plane 42 is larger than the distance 34 on the other side.

The screening plate 26 is located in a sector 35 around the rotary axis 6. The sector 35 in the illustrated form covers about 100°. The magnitude of the sector 35 may depend upon the distance of the screening plate 26 from the rotary axis 6, but the screening plate 26 is preferably located in a sector of about 80° to 120°. The sector 35 extends, in dependence upon the distance covered by the screening plate on both sides of the vertical plane 42, on one side of the vertical plane 42 over a larger distance than on the other side. The angle 36 is, therefore, in the illustrated form a few degrees larger than the angle 37. It will be appreciated that, if the direction of rotation of the distribution member is to be opposite the arrow 43, the sector angle 37 and the distance 34 will be made larger than the sector angle 36 and the distance 33.

The screening plate 26 has an opening 40 covering a height 44 from the bottom of the plate. This opening 40 is provided to receive the intermediate shaft 24. The height 44 is such that the intermediate shaft 24 can pass through the screening plate 26 throughout the range of positions of height possible for the device 1 with respect to the tractor 2.

During operation the device is coupled with the lifting device of the tractor as is shown in FIG. 1. The hopper 4 is charged with the material to be spread by being fed from the hopper via the dosing mechanism 16 to the distribution member 5. During the operation of the device, when the distribution member 5 is rotated about the rotary axis 6 by the power take-off shaft of the tractor in the direction of the arrow 43, the material is ejected by the distribution member over 360°. In order to spread the material uniformly over the entire circumference of the distribution member the ports 19 and 20 in the rings 17 and 18 are located at equal intervals from one another around the rotary axis 6, concentric therewith on a circle the diameter at which is preferably larger than ten centimeters and smaller than thirty centimeters. Although in the illustrated form eight ports are provided in both rings, the two rings may, as an alternative, have a greater or smaller number of ports. Preferably the number of ports will not be lower than four and not larger than fifteen.

Figure 5:
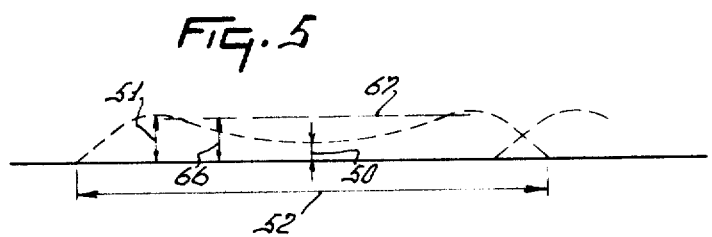
FIG. 5 is a vertical sectional view of the spectrum of FIG. 4.

Considering operation with the screening plate 26 omitted and the device standing still, material will be spread by the distribution member 46 over 360° and is desposited on the ground in an annulus 49 (FIG. 4), the outer circumference of which is located at a distance 47 from the rotary axis of the distribution member. The distance 47 depends upon the diameter of the distribution member, the speed of rotation thereof and upon the kind of material to be spread. In accordance with these factors the width of the annulus 49 may slightly vary. When the material is spread round about the distribution member and the device is moved on (tractor moving over the ground), the material will cover a strip of soil having a width equal to twice the distance 47. In vertical sectional view the material is spread in a distribution pattern as shown in FIG. 5. In this distribution pattern the middle of the covered strip 52 receives a smaller quantity of material, which is indicated by the distance 50, than areas located at a distance from the center line, as indicated by the distance 51. As shown, in FIG. 5, the distribution pattern decreases towards the limits of the strip 52. This decreasing density may be compensated for by overlapping neighboring strips. However, the unevenness occuring in the middle of a covered strip, as indicated by 50 in FIG. 5, cannot be compensated for so that an uneven distribution spectrum is obtained.

Figure 7:
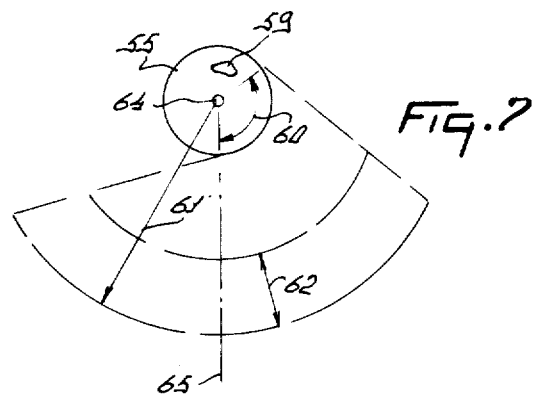
FIG. 7 is a schematic plan view of the distribution pattern of FIG. 6, illustrating a proposal for achieving such a spectrum.
Figure 6:
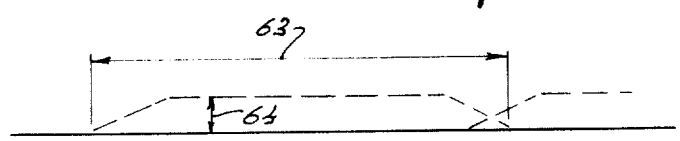
FIG. 6 is a vertical sectional view of a desired distribution spectrum.

It is however, in general, desirable to have a distribution pattern of the kind shown in FIG. 6. In order to obtain this pattern it has been suggested, as is shown schematically in FIG. 7 for a distribution member 55, to supply to the distribution member material eccentrically to a given area with respect to the rotary axis 64 of the distribution member. The material is supplied, for example, in the area 59 to the distribution member 55. The material will thus be spread over a sector 60 from the circumference of the distribution member in a manner such that (with the device standing still) the material covers a strip 62, the outer circumference of which is at a distance 61 from the rotary axis 64. With the same shape and diameter and with the same speed of rotation of the distribution members 46 and 55, and with the same kind of material, the distance 61 will correspond with the distance 47. During spreading in the manner illustrated in FIG. 7, when the device is moving along, the distribution pattern is obtained as shown in a vertical sectional view in FIG. 6. The material is then spread over a strip having a width 63 approximately equal to the width 52 of FIG. 5. It is desirable in this case that the material should be spread over equal distances on both sides of a vertical plane 65 containing the rotary axis 64. However, with an arrangement as shown in FIG. 7 the location of the width 63 with respect to the vertical plane 65 will vary when a different kind of material is spread, since, in dependence upon the granular size and the specific weight, the material will leave the circumference of the distribution member 55 at a different place and will be spread in a different direction. In an arrangement as shown in FIG. 7 it should, therefore, be arranged that the area 59 is variable. However, this requires additional provisions on the device and in practice complications are involved so that operation is more difficult and several structural measures have to be taken, whereby the device becomes more complicated. The disadvantages involved in an arrangement such as shown schematically in FIG. 7 are not found in the arrangement of FIG. 4. Although in the arrangement shown in FIG. 4 the distance 47 will vary when a different kind of material has to be spread, the distribution pattern shown in FIGS. 4 and 5 remains the same. Even when the speed of rotation of the distribution member is changed, the pattern shown schematically in FIGS. 4 and 5 will not vary apart from the distances 47 and 52. It is therefore desirable to obtain the unidirectional distribution given by the arrangement shown in FIG. 4 and to obviate the disadvantges of the arrangement shown in FIG. 7.

Operation of the device of FIGS. 1 to 3 with the deflector means 26 incorporated will now be considered. By providing the deflector means 26 the distribution pattern obtained is that as illustrated in a vertical sectional view in FIG. 6. In contrast to the pattern of FIG. 5 the middle area does not receive less material and the left and right-hand sides do not receive more material (as is symbolically indicated by the distance 50 and 51 in FIG. 5). In the present device the setting mechanism for regulating the quantity of material to be spread per unit time can be simple in that only the ring 18 is adjustable with respect to the ring 17 for producing a greater or smaller overlap of the ports 19 and 20. When spreading a different kind of material only the distribution width will be different. The distribution pattern, however, remains the same. If desired, the distribution width may be maintained at the same value by providing a possibility (which is not shown in detail) of varying the speed of rotation of the distribution member.

In the manner described a simple device is obtained which can provide, despite its simplicity a more desirable distribution pattern, while post-adjustment for different kinds of material to be spread is not required. The screening plate 26 is preferably made of such a material or has such a shape or both that the speed of the material ejected by the distribution member and impinging on the screening plate is reduced to an extent such that after the impact of the screening plate the material drops down in a substantially vertical direction. The speed of rotation of the distribution member is preferably higher than 200 rev/min and lower than 600 rev/min. Preferably the speed of rotation of the distribution member is between 300 rev/min and 600 rev/min. In the described embodiment of the speed of rotation amounts to about 450 RPM.

The diameter of the distribution member is chosen so that the material ejected by the distribution member attains a speed that can be reduced to an extent such as to prevent the material from moving laterally along the screen. In this respect the shape and/or the kind of material of the screen are also important. In the described embodiment the screening plate 26 is made of flexible material, for example, synthetic cloth. The synthetic cloth can be held at the top by a bracket that maintains the shape of the screen shown in FIGS. 1 and 2. In the described embodiment, where the speed of rotation is about 450 RPM, the diameter 38 is about eighty centimeters.

By arranging the deflector means 26 between the distribution member and the tractor, the deflector serves also as a screen preventing material from striking parts of the tractor.

The screen 26 may be made, as an alternative from a more rigid material than described above for example, a synthetic or metal sheet coated with shock-absorbing material.

With the dimensions of the distribution member in the described embodiment and with the other magnitudes mentioned above the material is spread over a width of about sixteen meters.

The device illustrated in FIGS. 8, 9 and 10 will now be described. The spreading device, indicated generally by reference numeral 80, is shown attached to a lifting device 81 of a tractor 82. The device 80 has a frame (not shown) supporting a hopper 83. On both sides of a vertical plane 84 passing through the longitudinal center line of the device there are three rotatable distribution members 85, 86, 87, 88, 89A and 90A respectively. These distribution members are mounted on carrier structures (not shown) of the frame of the device. Each of the distribution members is adapted to rotate about an upwardly extending rotary axis and is disposed near the end of a feeding mechanism formed by a conveyor belt, that is conveyor belts 89, 90 and 91 for the distribution members 85 to 87 and conveyor belts 92, 93 and 94 for the distribution members 88, 89A and 90A. Each of these conveyor belts is an endless belt, one run of which is located beneath the other, the upper run serving to transport the material to be spread from the hopper towards the distribution member concerned. The conveyor belts are received under outlet ports of the hopper. The quantity of material supplied per unit time from the hopper to the conveyor belts can be regulated by a dosing mechanism which, being within the skill of the art, is not shown in detail.

With respect to the intended direction of operative travel 95 of the device over the ground a deflector means 96 is arranged in front of each of the distribution members. Each of these screening plates is at right angles to the direction of travel 95 and has a length 97. Each of the deflector means 96 is at a distance 98 from the rotary axis of the distribution member concerned. The distance 98 is in the illustrated device slightly smaller than the diameter 99 of the distribution members, all having the same diameter and shape.

In the illustrated device the diameter of the distribution members is about twenty-eight centimeters and the distance 98 is about twenty-four centimeters. During the operation of the device each of the distribution members is rotated about its rotary axis with the same speed. The speed of rotation of the distribution members in operation is about 500 RPM. The disposition of each of the deflector means 96 with respect to the vertical plane 100 extending in the direction of travel 95 and going through the rotary axis of the distribution member concerned is the same as in the device of FIGS. 1 and 2 so that further explanation may be omitted. The distances 97 and 98 with respect to the diameter 99 of the distribution members are approximately the same as indicated for the deflector means 26 with respect to the distribution member 5 of FIGS. 1 and 2.

Figure 9:
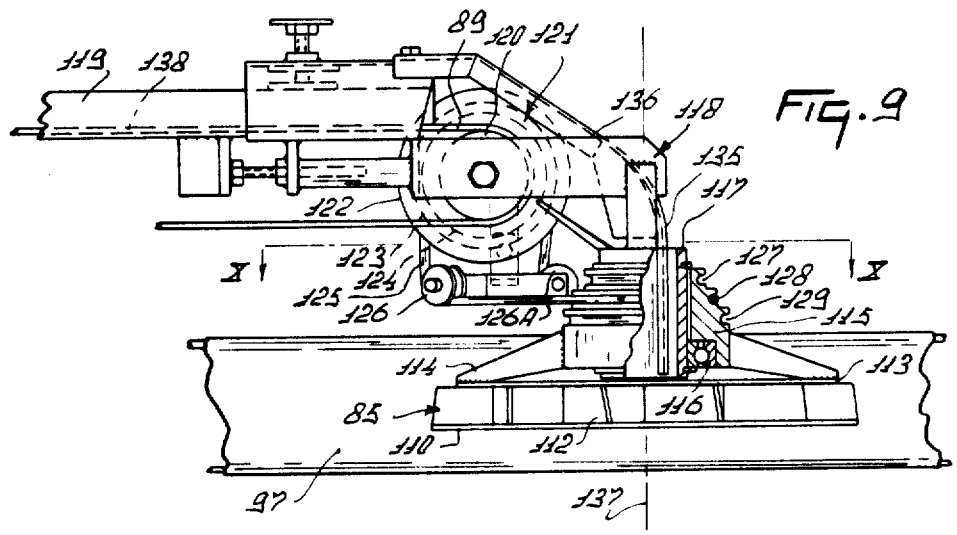
FIG. 9 is a side view on a larger scale of part of the device of FIG. 8 taken in the direction of the arrow IX in FIG. 8.
Figure 10:
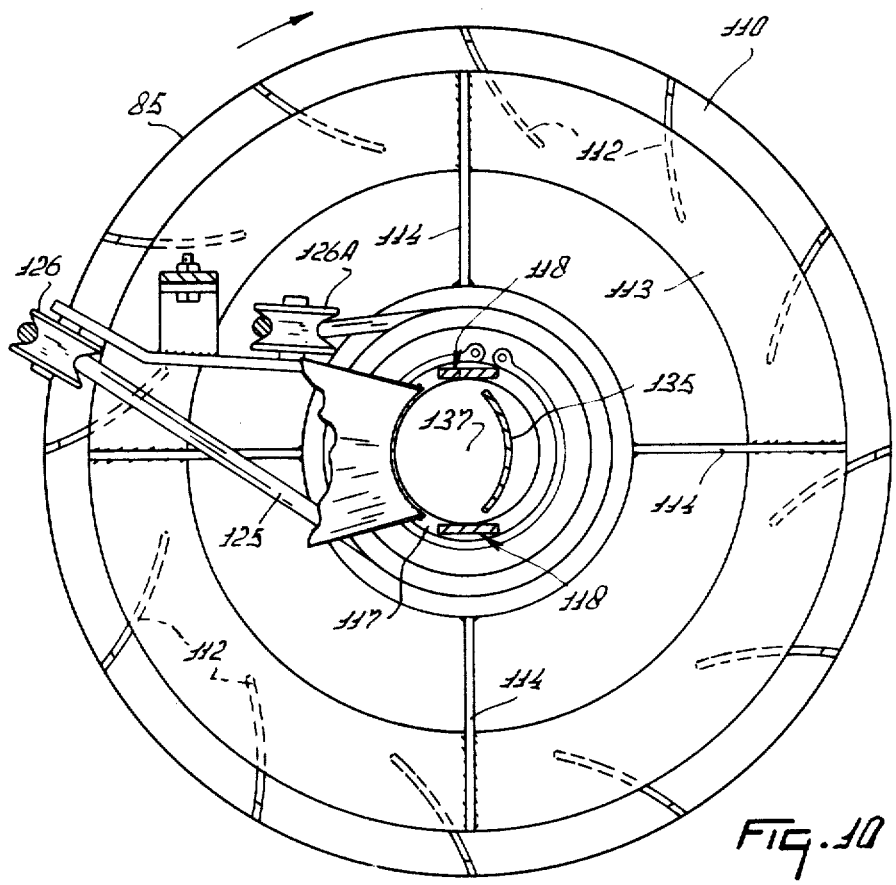
FIG. 10 is a plan view on a still larger scale of part of the component shown in FIG. 9 taken on the line X—X in FIG. 9.

In the device of FIGS. 8 to 10 all the distribution members are constructed and fastened in the same manner to the supports of the frame, as shown in FIGS. 9 and 10 in detail for the distribution member 85. The distribution member 85 comprises a disc 110 supporting twelve ejecting blades 112. Above the ejecting blades 112 a ring 113 is fastened and connected by means of plates with a sleeve 115, which is rotatably mounted on a shaft 117 by means of a bearing 116. The shaft 117 is held by support 118 on a supporting structure 119 of the frame of the device, which is not shown in detail. The structure 119 holds the upper run of the conveyor belt 89, which is passed around a supporting roller 120 rotatably fastened to the structure 119. To the supporting roller 120 is rigidly secured a driving disc 121 having preferably at least two rope grooves, in this embodiment three rope grooves 122, 123, 124 of different diameters. An endless rope 125 passing around the disc 121 is connected along two reversing rollers 126, 126A with the driven disc formed by the outer circumference of the sleeve 115 having preferably a number of grooves equal to the number of grooves in the disc 121. In this embodiment the sleeve 115 has three rope grooves 127, 128 and 129 corresponding with the rope grooves 122, 123 and 124. Instead of a rope with rope grooves in the disc 121 and sleeve 115, there may be used a belt with a number of belt faces on the disc 121 and the sleeve 115.

The supporting shaft 117 is a hollow cylinder through which extends a guide plate 135 in a direction parallel to the direction of the shaft 117, i.e. in a vertical direction parallel to the rotary axis 137 of the distribution member 85. The guide plate 135 forms the lower end of a guide 136 extending from the top of the cylinder 117 via a curved part in upwardly inclined direction into the proximity of the part of the conveyor belt 89 located above the roller 120. The part of the guide plate 135 located in the cylinder 117 is slightly curved viewed in a horizontal section, but is not concentric with the rotary axis 137 of the distribution member 85, as is shown in FIG. 10.

During operation the material to be spread is fed in the desirable, dosed quantities from the hopper 83 to the conveyor belts 89 to 91 and 92 to 94. Each of the conveyor belts transports the material towards the end of the belt remote from the hopper, where it is transferred to the distribution member located at this end of the conveyor belt. The conveyor belts are driven by the power take-off shaft of the tractor carrying the device through transmission mechanisms not shown in detail. Each of the distribution members is driven by the end roller, for example, the roller 120 near the end of the associated conveyor belt. The material is conveyed on the upper run of the conveyor belt, for example, the run 138 of the conveyor belt 89 of FIG. 9. The speed of travel of the conveyor belt is such that the material is thrown from the end of the conveyor belt against the guide 136, along which it is guided downwards through the hollow cylinder 117 to the center of the distribution member concerned. The guide is shaped so that the material is centrally distributed around the rotary axis 137 on the disc, for example the disc 110, of the distribution member concerned. From the center of the distribution member the material is passed towards the ejecting arms owing to the rotation of the distribution member. The material is ejected by the distribution member over 360° around the axis 137. A portion of the material is projected against the screening plates, for example, the screening plate 96, so that a uniform distribution pattern corresponding with the distribution pattern of FIG. 6 described above is obtained.

Each of the distribution members spreads the material over a width of about six meters. The distribution members are spread apart by a distance 139 of about two meters. In this manner the distribution pattern produced by one distribution member overlaps that produced by a neighboring distribution member over a large distance. As a result thereof and owing to the presence of the screening plates 96 the device shown in FIGS. 8 to 10 uniformly spreads the material over a broad strip of land during operative travel of the device over the ground. The strip of land receiving the material from the device of FIGS. 8 to 10 having six ejecting discs, the outermost ejecting discs being spaced apart by a distance of 10 meters, has a width of about sixteen meters, the distribution pattern being uniform over about thirteen meters and the amounts of material deposited over about the outermost one to two meters diminishing progressively towards the edges. During distribution on neighboring strips these margins are overlapped by corresponding margins of the neighboring strip so that an overall uniform pattern of distribution, for example of fertilizer is obtained.

The distance over which the material is spread by each distribution member depends upon the speed of rotation and the kind of material. The speed of rotation of the distribution member can be changed to some extent by selecting which one of the three rope grooves 122 to 124 and the corresponding one of the rope grooves 127 to 129 the transmission rope 125 is passed around. Thus the speed of rotation of the distribution member can be adapted to the kind of material to be spread that the distribution member spreads the material over the desired width for ensuring a most uniform distribution of material on the overall strip covered.

Although in the device of FIGS. 8 to 10 the screening plate is arranged in front of each of the distribution members, viewed with respect to the direction of travel 95, the screening plates may, as an alternative be arranged behind the distribution members with respect to the direction of travel 95 as is shown in FIG. 11 for the distribution members 85 and 86. As has been broadly described with reference to FIGS. 1 and 2, the location of the screening plates with respect to the direction of rotation of the distribution members has to be taken into account so that the screening plates, for example, the deflectors 140 in FIG. 11 will have to be disposed slightly shifted towards the outer side of the device with respect to the location of the plates 96 of FIG. 8. However, as an alternative, the screening plates may have a width 97 such that they may be symmetrical to the vertical plane 100 so that there is no difference in disposition of the screening plates in front of or behind the distribution members with respect to the direction of travel 95.

A satisfactory distribution of the material is also obtained by providing a deflector means both in front of and behind the distribution members as is shown schematically in FIG. 12. FIG. 12 shows two deflector means 141 and 142 one of which is situated in front of the vertical plane 195 that is transverse to the direction of operative travel 146 and one of which is situated behind the plane 145. These screening plates are identical and substantially correspond with the screening plates such as the plate 96 of FIG. 8 so that further description is not required. The screening plates each cover equal distances on either side of a vertical plane 147 extending in the direction of travel 146 and passing through the rotary axis of the distribution member concerned. The screening plates 141 and 142 are shown near distribution members 143 and 144 comparable with the distribution members 85 and 86 of FIG. 8. When screening plates are disposed on opposite sides of the distribution members the material is thrown against the plates both in front of and behind the distribution members.

The velocity of the material striking the screening plates depends to some extent upon the speed of rotation of the distribution member. As stated above, this speed is preferably controlled so that the material does not impinge upon the screening plates with excessive velocity in order to avoid passing of the material laterally along the screening plate.

The devices described above are of simple construction. In particular the screening plates have a simple structure and are mounted in a simple manner. As is shown, each of the screening plates extends on only one side of the vertical plane at right angles to the direction of operative travel of the device and passing through the rotary axis of the distribution member.

Although in the devices shown the screens are straight, their ends may be slightly curved in a direction toward, for example, the plane 145.

Despite the fact that the screens have a length considerably smaller than the width of spread of the distribution member, they influence the spread round about the circumference of the distribution member to an extent such that a uniform distribution pattern is obtained as explained above. As compared with the distribution pattern of FIG. 5 the peaks 51 are slightly clipped by the use of the screening plates 26 whereas the area at height 50 is slightly filled up so that the distribution pattern indicated by the broken lines 67 in FIG. 5 is obtained, the height 66 of which is smaller than the height 51 and larger than the height 50.

Thus deflector means 26, 96, 140, 141 and 142 constitute simple means located only in front of or behind the distribution members or both for ensuring a satisfactory operation of the spreading device.

Although various features of the spreading device described and illustrated in the drawings, will be set forth in the following claims as inventive features, it is to be understood the invention is not necessarily limited to these features and may encompass all of the features disclosed, both individually and in various combinations.

Having described our invention, what we claim as new and desire to secure by Letters Patent of the United States is:

1. A device for spreading material comprising material ejecting means which includes at least one distribution member adapted to rotate about a substantially vertical axis, material feeding means of such character that through which, during the operation of the device, material to be spread by said ejecting means is supplied substantially 360° around said axis to said distribution member and material is ejected substantially uniformly substantially 360° outwardly from said distribution member, and material deflector means which is substantially straight as seen in plan and located outwardly of the circumference of said distribution member, said deflector means being entirely spaced from a plane passing through said axis and being disposed at substantially a right angle to the intended direction of operative travel of the device and otherwise being so constructed and arranged that material from said ejecting means impinges on said deflector means and is received on the underlying surface in a substantially uniform density.

2. A device as claimed in claim 1, wherein said deflector means comprises a screening plate which is substantially at right angles to the longitudinal centerline of the device.

3. A device as claimed in claim 2, wherein said screening plate extends on both sides of a vertical plane passing through said axis in said direction of operative travel.

4. A device as claimed in claim 3, wherein, measured in the plane of rotation of said distribution member, said screening plate is located at a distance from said axis which exceeds three-quarters of the diameter of said distribution member.

5. A device as claimed in claim 4, wherein measured in the plane of rotation of said distribution member, the distance between said screening plate and said axis is substantially equal to the diameter of said distribution member.

6. A device as claimed in claim 4, wherein the distance between said screening plate and said rotary axis of said distribution member is not larger than twice the diameter of said distribution member.

7. A device as claimed in claim 3, wherein said screening plate extends on one side of said vertical plane over a larger distance than it extends on the other side of said vertical plane.

8. A device as claimed in claim 7, wherein said screening plate extends over the larger distance on the side of said vertical plane from which the part of said distribution member located nearest said screening plate moves across said vertical plane during operation of the device.

9. A device as claimed in claim 2, wherein said screening plate covers overall a distance which is at least about 1.5 times the diameter of said distribution member and is smaller than 4-times the diameter of said distribution member.

10. A device as claimed in claim 9, wherein said screening plate covers overall a distance which is approximately equal to 2.5 times the diameter of said distribution member.

11. A device as claimed in claim 2, wherein, as viewed with respect to said direction of operative travel said screening plate is located in front of said distribution member.

12. A device as claimed in claim 2, wherein a further screening plate is provided whereby there are two screening plates, and wherein, as viewed with respect to said direction of operative travel one of these screening plates is provided in front of said distribution member.

13. A device as claimed in claim 2, wherein said device is provided with means for attaching the device to the lifting device of a tractor or a similar vehicle, said distribution member being disposed near the longitudinal centerline of the tractor or like vehicle, said screening plate being located between the tractor or like vehicle and said distribution member.

14. A device as claimed in claim 2, wherein the distance between said screening plate and said axis is adjustable.

15. A device as claimed in claim 2, wherein said screening plate has at its top a rim inclined upwardly.

16. A device as claimed in claim 2, wherein said screening plate extends to above a plane at right angles to said axis and passing through the topmost part of said distribution member.

17. A device as claimed in claim 16, wherein said screening plate extends in downward direction below a plane at right angles to said axis and passing through the lowermost part of said distribution member.

18. A device as claimed in claim 17, wherein said screening plate extends farther below the lower of the two last mentioned planes than it does above the upper of these two planes.

19. A device as claimed in claim 2 including associated control means the speed of rotation of said distribution member during operation is controllable.

20. A device for spreading material comprising at least one distribution member adapted to rotate about a substantially vertical axis, feed means through which, during the operation of the device, material to be spread is supplied around said axis to said distribution member, and deflector means located outwardly of the circumference of said distribution member, said deflector means being entirely spaced from a plane passing through said axis and being disposed at substantially a right angle to the intended direction of operative travel of the device, said deflector means comprising a screening plate which is substantially at right angles to the longitudinal centerline of the device and is substantially straight as seen from above, said screening plate extending on both sides of a vertical plane passing through said axis in said direction of operative travel, said screening plate extending on one side of said vertical plane for a larger distance than it extends on the other side of said vertical plane, said screening plate extending for a larger distance on that side of said vertical plane from which the part of said distribution member located nearest said screening plate moves across said vertical plane. during operation of the device, said screening plate extending on one side of said vertical plane over a distance which is not larger than about 1.5 times the distance covered by said screening plate on the other side of said vertical plane.

21. A device as claimed in claim 20, wherein said screening plate extends on one side of said vertical plane over a distance which is at least about 1.2 times the distance covered by said screening plate on the other side of said vertical plane.

22. A device for spreading material, comprising material ejecting means which includes at least one distribution member adapted to rotate about a substantially vertical axis, and material feeding means of such character that through which, during operation of the device, material to be spread is supplied substantially at 360° around said axis to said distribution member and material is ejected substantially uniformly substantially 360° outwardly from said distribution member, and material deflector means located outwardly of the circumference of said distribution member, said deflector means being entirely spaced from a plane passing through said axis and being disposed at substantially right angles to the longitudinal centerline and direction of operative travel of the device, said deflector means comprising a screening plate which is configured whereby the kinetic energy of material impinging thereon is reduced to an extent that after impact on said screening plate the material drops substantially directly downwardly as seen from said direction of travel and said deflector means otherwise being so constructed and arranged that material from said ejection means which impinges on said deflector means is received on the underlying surface in a substantially uniform density.

23. A device as claimed in claim 22, wherein said screening plate is made of flexible material.

24. A device as claimed in claim 23, wherein said flexible material is synthetic cloth.

25. A device for spreading material comprising at least one distribution member adapted to rotate about a substantially vertical axis, feed means through which, during the operation of the device, material to be spread is supplied around said axis to said distribution member, and deflector means located outwardly of the circumference of said distribution member and extending as seen from above substantially in the same direction without curving, said deflector means being entirely spaced to the rear of a plane tangential to the rearmost operative circumference of said distribution member and being disposed at substantially a right angle to the intended direction of operative travel of the device, said deflector means comprising a screening plate extending on both sides of a vertical plane passing through said axis in said direction of operative travel, said screening plate having a width which is at least about 1.5 times the operative diameter of said distribution member and is smaller than four times said diameter of the distribution member, said screening plate being located at a distance from said axis which exceeds three-quarters of the diameter of said distribution member and being so constructed and arranged that it modifies the distribution pattern of the material being spread to be received on the underlying surface in a substantially uniform density.

26. A device as claimed in claim 25, wherein said plate is substantially at right angles to the longitudinal centerline of the device.

27. A device as claimed in claim 25, wherein said screening plate extends on one side of said vertical plane for a longer distance than it extends on the other side of said vertical plane, said screening plate extending for a longer distance on that side of said vertical plane through which the part of said distribution member located nearest said screening plate first moves during operation of the device.

28. A device for spreading material comprising at least one distribution member adapted to rotate about a substantially vertical axis, feed means through which, during the operation of the device, material to be spread is supplied around said axis to said distribution member, and deflector means located outwardly of the circumference of said distribution member, said deflector means being entirely spaced from a plane passing through said axis and being disposed at substantially a right angle to the intended direction of operative travel of the device, said deflector means comprising a screening plate which is substantially at right angles to the longitudinal centerline of the device, said screening plate having a width which is at least about 1.5 times the operative diameter of said distribution member and is smaller than about four times said diameter of the distribution member, said screening plate not being curved as seen from above throughout said width, said screening plate intercepting the plane of rotation of said distribution member and being located at a distance from said axis which exceeds three-quarters of the diameter of said distribution member and of such character to modify the spreading pattern of the material so it is received on the underlying surface in a substantially uniform density.

29. A device for spreading material comprising at least one distribution member adapted to rotate about a substantially vertical axis, feed means through which, during the operation of the device, material to be spread is supplied around said axis to said distribution member, and deflector means located outwardly of the circumference of said distribution member, said deflector means being entirely spaced to the rear of a plane tangential to the rear circumference of said distribution member and being disposed at substantially a right angle to the intended direction of operative travel of the device, said deflector means comprising a screening plate extending on both sides of a vertical plane passing through said axis in said direction of operative travel, said screening plate extending over an angle around said vertical axis which is smaller than 120° and larger than 80°, said screening plate being straight as seen from above through at least 80° of said angle, said screening plate being spaced from said vertical axis over a distance which exceeds three-quarters of the diameter of said distribution member and otherwise being arranged so it is adapted to cause the material being spread to be received on the underlying ground in a density which is substantially uniform.

30. A device as claimed in claim 29, wherein said angle is about 100°.

31. A device as claimed in claim 29, wherein said screening plate extends on one side of said vertical plane for a longer distance that it extends on the other side of said vertical plane, said screening plate extending for a longer distance on that side of said vertical plane through which the part of said distribution member located nearest said screening plate first moves across during operation of the device.

32. A device for spreading material comprising material ejecting means which includes at least one distribution member adapted to rotate about a substantially vertical axis, material feeding means of such character that through which, during the operation of the device, material to be spread is supplied substantially 360° around said axis to said distribution member and material is ejected substantially uniformly substantially 360° outwardly from said distribution member by said ejecting means, and material deflector means located outwardly of the circumference of said distribution member, said deflector means being entirely spaced from a plane passing through said axis and being disposed at substantially a right angle to the intended direction of operative travel of the device, said deflector means comprising a screening plate which has a substantially flat shape and is substantially at right angles to the longitudinal centerline of the device, said deflector means otherwise being so constructed and arranged that material from said ejecting means which impinges on said deflector means is received on the underlying surface is substantially uniform density.

33. A device for spreading material comprising at least one distribution member adapted to rotate about a substantially vertical axis, feed means through which, during the operation of the device, material to be spread is supplied around said axis to said distribution member, and deflector means located outwardly of the circumference of said distribution member, said deflector means being entirely spaced to the rear of a plane tangential to the rear circumference of said distribution member and being disposed at substantially a right angle to the intended direction of operative travel of the device, said deflector means comprising a screening plate extending on both sides of a vertical plane passing through said axis in said direction of operative travel, said screening plate extending over an angle around said vertical axis which is smaller than 120° and larger than 80°, said screening plate being spaced from said vertical axis over a distance which exceeds three-quarters of the diameter of said distribution member and, as seen in plan, being substantially straight and extending at right angles to the longitudinal centerline of the device, said screening plate otherwise being arranged so it is adapted to cause the material being spread to be received on the underlying ground in a density which is substantially uniform.

* * * * *